(12) United States Patent
Chew

(10) Patent No.: US 9,864,635 B2
(45) Date of Patent: Jan. 9, 2018

(54) REDUCING THE NUMBER OF READ/WRITE OPERATIONS PERFORMED BY A CPU TO DUPLICATE SOURCE DATA TO ENABLE PARALLEL PROCESSING ON THE SOURCE DATA

(71) Applicant: Intel Corporation, Santa Clara, CA (US)

(72) Inventor: Yen Hsiang Chew, Georgetown (MY)

(73) Assignee: Intel Corporation, Santa Clara, CA (US)

( * ) Notice: Subject to any disclaimer, the term of this patent is extended or adjusted under 35 U.S.C. 154(b) by 315 days.

(21) Appl. No.: 14/125,144

(22) PCT Filed: Dec. 27, 2012

(86) PCT No.: PCT/US2012/071721
§ 371 (c)(1),
(2) Date: Dec. 10, 2013

(87) PCT Pub. No.: WO2013/103571
PCT Pub. Date: Jul. 11, 2013

(65) Prior Publication Data
US 2014/0310721 A1    Oct. 16, 2014

(30) Foreign Application Priority Data
Jan. 6, 2012   (MY) ............................... 2012000073

(51) Int. Cl.
*G06F 9/50*       (2006.01)
*G06F 9/30*       (2006.01)
(Continued)

(52) U.S. Cl.
CPC ............ *G06F 9/50* (2013.01); *G06F 9/30043* (2013.01); *G06F 9/3824* (2013.01);
(Continued)

(58) Field of Classification Search
CPC ...... G06F 9/50; G06F 9/30043; G06F 9/3824; G06F 9/544; G06F 9/3885; G06G 5/393; G06G 2360/127; G06G 5/001
See application file for complete search history.

(56) References Cited

U.S. PATENT DOCUMENTS 6,100,906 A * 8/2000 Asaro .................... G09G 5/363
345/213
6,785,751 B1 * 8/2004 Connor ............... G06F 13/4031
710/22

(Continued)

FOREIGN PATENT DOCUMENTS

| CN | 101344842 A | 1/2009 |
|---|---|---|
| CN | 101639930 A | 2/2010 |
| WO | 2013103571 A1 | 7/2013 |

OTHER PUBLICATIONS

International Search Report and Written Opinion received for PCT Patent Application No. PCT/US2012/071721, dated Apr. 22, 2013, 9 Pages.

(Continued)

*Primary Examiner* — Benjamin Wu
(74) *Attorney, Agent, or Firm* — Jordan IP Law, LLC

(57) ABSTRACT

Methods and apparatuses to reduce the number of read/write operations performed by a CPU may involve duplicating source data to enable parallel processing on the source data. A memory controller may be configured to duplicate data written to a first buffer to one or more duplicate buffers that are allocated to one or more processing threads, respectively. In some implementations, the one or more duplicate buffers are dedicated buffers, and the addresses of the first buffer and the one or more duplicate buffers are stored in a register of memory controller.

15 Claims, 4 Drawing Sheets

(51) Int. Cl.
*G06F 9/38* (2006.01)
*G06F 9/54* (2006.01)
*G09G 5/393* (2006.01)
*G09G 5/00* (2006.01)

(52) U.S. Cl.
CPC ............ *G06F 9/3885* (2013.01); *G06F 9/544* (2013.01); *G09G 5/393* (2013.01); *G09G 5/001* (2013.01); *G09G 2360/127* (2013.01)

(56) References Cited

U.S. PATENT DOCUMENTS

| | | | |
|---|---|---|---|
| 7,019,752 B1 | 3/2006 | Paquette et al. | |
| 7,477,205 B1* | 1/2009 | de Waal | G06F 3/1431 345/1.1 |
| 7,617,369 B1* | 11/2009 | Bezbaruah et al. | 711/162 |
| 8,319,785 B2* | 11/2012 | Roh | G09G 5/393 345/531 |
| 8,810,480 B2* | 8/2014 | Fullerton | G06F 3/1423 345/3.3 |
| 8,854,320 B2* | 10/2014 | Hirata | G06F 3/03547 345/173 |
| 9,412,329 B2* | 8/2016 | Fullerton | G06F 3/1423 |
| 2003/0079109 A1 | 4/2003 | Pechanek et al. | |
| 2004/0078630 A1* | 4/2004 | Niles et al. | 714/5 |
| 2004/0085322 A1 | 5/2004 | Alcorn et al. | |
| 2004/0098721 A1* | 5/2004 | Alverson | G06F 9/52 718/102 |
| 2005/0050115 A1* | 3/2005 | Kekre | G06F 11/2058 |
| 2007/0245087 A1 | 10/2007 | Sakata | |
| 2008/0276032 A1* | 11/2008 | Iida | G06F 3/0619 710/316 |
| 2010/0005274 A1 | 1/2010 | Van De Waerdt | |
| 2010/0026691 A1* | 2/2010 | Yan | 345/502 |
| 2011/0069833 A1 | 3/2011 | Volkoff et al. | |
| 2011/0169848 A1* | 7/2011 | Bratt | G09G 5/363 345/545 |
| 2011/0196899 A1 | 8/2011 | Hughes et al. | |
| 2011/0285729 A1* | 11/2011 | Munshi | G06F 9/5044 345/536 |
| 2012/0176396 A1* | 7/2012 | Harper | G06F 3/1431 345/589 |
| 2013/0138841 A1* | 5/2013 | Xu | G06F 13/28 710/26 |

OTHER PUBLICATIONS

International Preliminary Report on Patentability and Written Opinion received for PCT Patent Application No. PCT/US2012/071721, dated Jul. 17, 2014, 6 pages.
Search Report for European Patent Application No. 12864444.0, dated Jul. 5, 2016, 9 pages.
Black-Schaffer et al., "Block-Parallel Programming for Real-Time Embedded Applications", Parallel Processing (ICPP), 2010 39th International Conference On, IEEE, Sep. 13, 2010, 10 pages.

* cited by examiner

REDUCING THE NUMBER OF READ/WRITE OPERATIONS PERFORMED BY A CPU TO DUPLICATE SOURCE DATA TO ENABLE PARALLEL PROCESSING ON THE SOURCE DATA

BACKGROUND

Certain video-enabled computing systems may use multiple processing threads in order to achieve faster processing of video. To enable parallel processing of the same source data by a plurality of processing threads that may implement different video processing algorithms in a computer system, the source data may be replicated in a plurality of buffers allocated to the plurality of processing threads respectively. In this way, each processing thread may process the source data without interfering with the use of the source data by any other processing thread.

Replicating the source data into a plurality of buffers may involve a central processing unit (CPU) of the computer system reading the source data from memory and then writing the source data to the plurality of buffers. In video processing, for example, as video frame data is loaded into a frame buffer from a video file or an external device such as a camera, the CPU may read the frame data from the frame buffer and then write the frame data to the plurality of buffers for each video frame loaded. Thus, parallel processing on video may require a read/write operation by the CPU for each frame. Performing such read/write operations may decrease the overall performance of a parallel processing computing system.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Various implementations of this disclosure provide apparatuses and methods to reduce the number of read/write operations performed by a CPU to duplicate source data to enable parallel processing on the source data.

Figure 1:
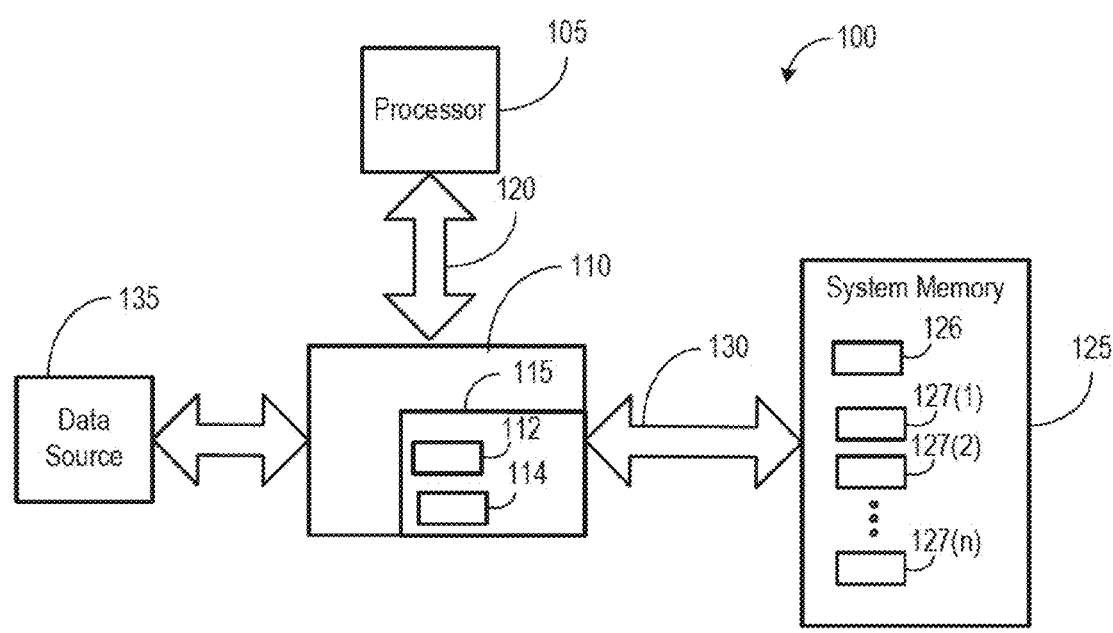
FIG. 1 is a block diagram illustrating an example system configured to reduce read/write operations according to embodiments.

FIG. 1 illustrates an example system 100 to reduce the number of read/write operations performed by a processor, wherein source data is duplicated to enable parallel processing on the source data. The system 100 may include a processor 105 coupled to a bus controller 110 via a CPU bus 120. In some implementations, the system 100 may include multiple processors. The bus controller 110 may include a memory controller 115. In some implementations, the memory controller 115 may be external to the bus controller 110. The memory controller 115 may interface the processor 105 to a system memory 125 via a memory bus 130. The system memory 125 may consist of dynamic random access memory (DRAM) modules that are accessed by the memory controller 115. In some implementations, as described in more detail below, the system memory 125 may include a first buffer 126 to store data to be processed by a first processing thread and one or more duplicate buffers 127(1) . . . 127(n) to store the same data stored in the first buffer 126 to be processed by one or more other processing threads, respectively. In some implementations, as described in more detail below, the memory controller 115 also includes a register 112 to store the addresses of the first buffer 126 and the address of one or more duplicate buffers 127(1) . . . 127(n), and a register 114 to store replicate-buffer bits to indicate whether the data stored in the first buffer 126 should be duplicated in the one or more duplicate buffers 127(1) . . . 127(n), respectively.

In some implementations, the system memory 125 may store information and instructions to be executed by the processor 105. In particular, the system memory 125 may store instructions that, when executed by the processor 105, cause the processor 105 to execute the process described with reference to FIG. 2B. The system memory 125 may also store data to be accessed by the processor 105 to execute one or more processor threads. In some implementations, the system memory 125 may store pixels that are part of one or more image frames received from the data source 135 to be processed by the processor 105. In some implementations, a graphics processor may process frame data stored in the first buffer 126 and the one or more duplicate buffers 127(1) . . . 127(n).

To reduce the number of read/write operations performed by the processor 105 to duplicate source data to enable parallel processing on the source data, the memory controller 115 may be configured to duplicate data written to the first buffer 126 to the one or more duplicate buffers 127(1), . . . , 127(N) that are allocated to one or more processing threads, respectively. In some implementations, the one or more duplicate buffers 127(1), . . . , 127(N) are dedicated buffers. In addition, the addresses of the first buffer 126 and the one or more duplicate buffers 127(1), . . . , 127(N) may be stored in a register 112 of memory controller 115. In some implementations, when a processing thread allocates a buffer to store and process the data stored in the first buffer 126, the processing thread writes the address of its buffer to the register 112. Thus, when the memory controller 115 receives a command to write data to the first buffer 126, the memory controller 115 automatically duplicates the data written to the first buffer 126 to the duplicate buffers having addresses stored in register 112 without the use of the processor 105. Thus, unlike existing systems, to replicate the source data to a plurality of buffers to enable parallel processing of the source data, the illustrated processor 105 does not read the source data from the first address 126 and then write the source data to the duplicate buffers 127(1), . . . , 127(N).

In some implementations, the memory controller 115 duplicates the data stored in the first buffer 126 to a duplicate buffer only if a replicate-buffer bit in register 114 corresponding to the duplicate buffer is set. In some implementations, once data is duplicated to a duplicate buffer, the corresponding replicate-buffer bit is reset. In some implementations, once data is duplicated to a duplicate buffer, the memory controller 115 sends a frame-ready signal to the processor 105 to inform the processor 105 that the data is available for processing.

Figures 2A, 2B:
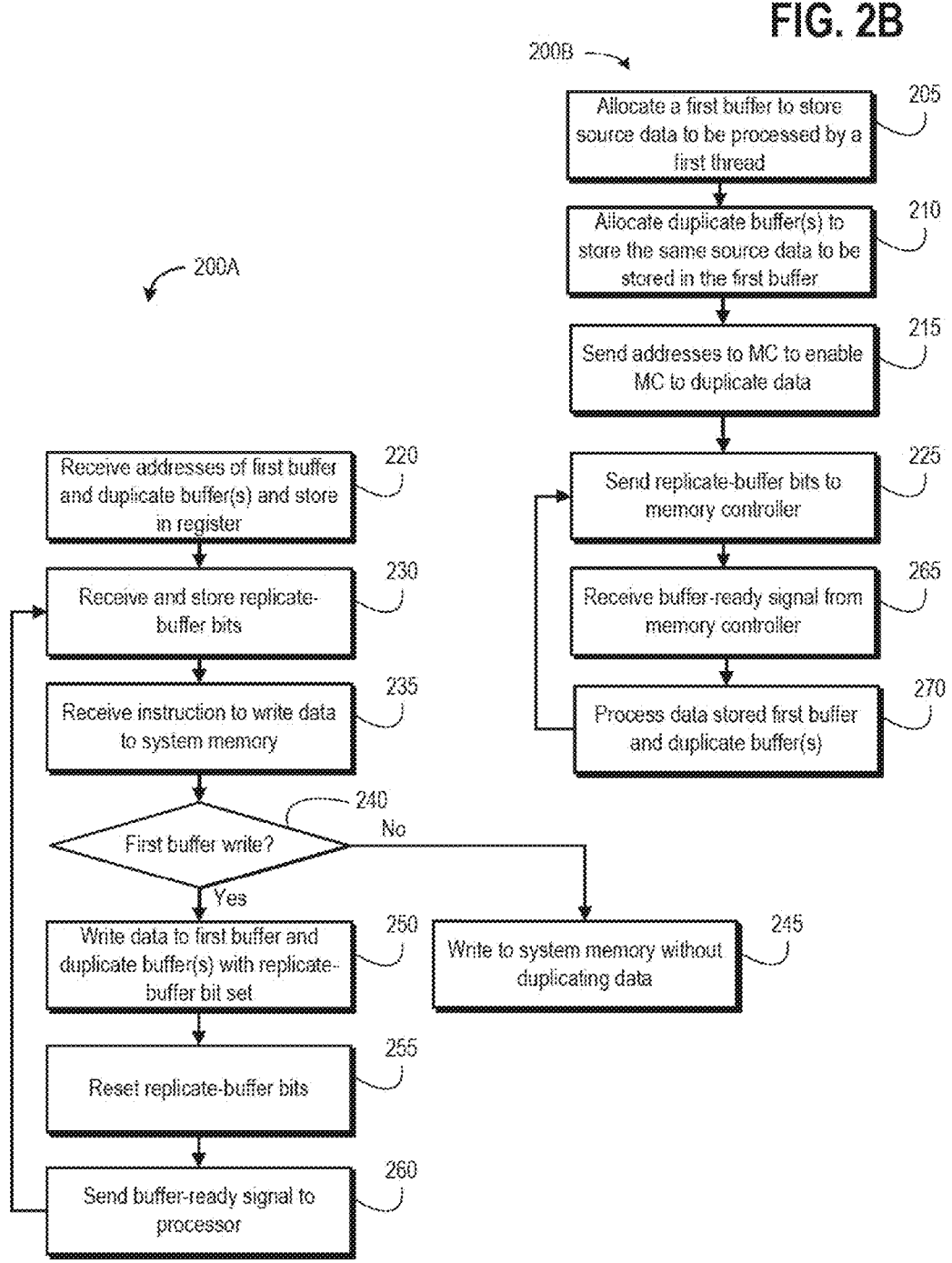
FIGS. 2A and 2B illustrate example processes performed by a memory controller and a processor of the example system of FIG. 1, respectively, according to an embodiment.

With continuing reference to FIGS. 1, 2A and 2B example processes 200A and 200B performed by the memory controller 115 and the processor 105, respectively, are shown, wherein the processes 200A and 200B may reduce the number of read/write operations needed to duplicate source data in conjunction with parallel processing on source data.

At stage 205, the processor 105 may allocate a first buffer (e.g., the first buffer 126) to store source data to be processed by a first thread (e.g., a first video processing thread or video load thread).

At stage 210, the illustrated processor 105 allocates one or more duplicate buffers (e.g., the duplicate buffers 127(1), . . . , 127(n)) to store the source data to be stored in the first buffer to be processed by one or more other processing threads, respectively.

At stage 215, the processor 105 can send the addresses of the first buffer and the one or more duplicate buffers to the memory controller 115 to enable the memory controller 115 to duplicate data written to the first buffer to the one or more duplicate buffers (e.g., duplicate buffers 127(1), . . . , 127(N)) based on these addresses.

At stage 220, the memory controller 115 may receive the addresses and stores them in a register (e.g., register 112).

At stage 225, for each processing thread to process data to be stored in the first buffer, the illustrated processor 105 sends a corresponding replicate-buffer bit to memory controller 112 to inform the memory controller 112 to duplicate the source data to be stored in the first buffer in the corresponding duplicate buffer for the processing thread.

At stage 230, the memory controller 115 may receive and store (e.g., in the register 114) the replicate-buffer bits.

At stage 235, the memory controller 115 can receive (e.g., from the processor 105 or the data source 135) an instruction to write data to the system memory 125.

At stage 240, the illustrated memory controller 115 determines whether the write instruction is to the first buffer.

If the write instruction is not to the first buffer ("No" at stage 240), the memory controller 115 may write to system memory 125 without duplicating the data at stage 245.

If the write instruction is to the first buffer ("Yes" at stage 240), the memory controller 115 may write the data to the first buffer and also write the data to each duplicate buffer that has its corresponding replicate-buffer bit set at stage 250.

At stage 255, the replicate-buffer bits can be reset (e.g., by memory controller 115) so that future source data is not duplicated unless set by the processor 105. In some implementations, the replicate-buffer bits will remain set until they are reset by processor 105.

At stage 260, the illustrated memory controller 115 sends a buffer-ready signal to processor 105 to inform the processor 105 that data has been stored to the first buffer and the one or more duplicate buffers.

The memory controller 115 may repeat stages 230-265 until all the data is loaded to the first buffer.

At stage 265, the processor 105 may receive the buffer-ready signal from memory controller 115.

At stage 20, the illustrated processor 105, and more specifically, the processing threads, process in parallel the data stored in the first buffer and the one or more duplicate buffers.

The processor 105 may repeat stages 225 and 265-270 until all the data is duplicated in the duplicate buffers.

As mentioned above, in some embodiments the replicate-buffer bits will remain set until they are reset by processor 105. In such embodiments, all data written to the first buffer will always get replicated to the one or more duplicate buffers until all the data is loaded to the first buffer.

Computing devices contemplated to be within the scope of this disclosure include personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Figure 3:
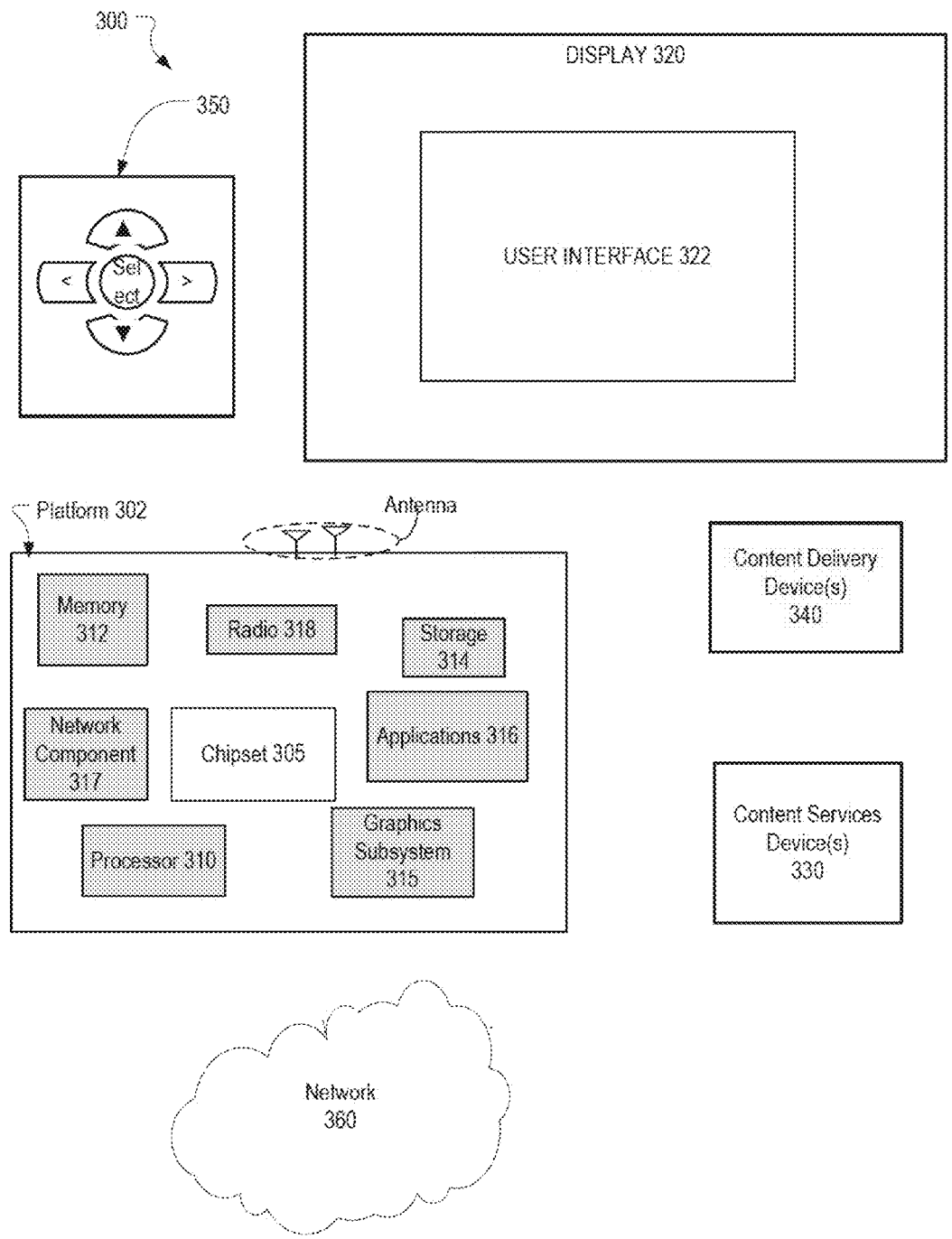
FIG. 3 is a block diagram illustrating an example system of this disclosure.

FIG. 3 illustrates an example embodiment of a system 300 of this disclosure comprising a platform 302, a display 320, content services device(s) 330, content delivery device(s) 340, and navigation controller 350. In embodiments, system 300 may be a media system although system 300 is not limited to this context. For example, components of system 300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 300 comprises a platform 302 coupled to a display 320. Platform 302 may receive content from a content device such as content services device(s) 330 or content delivery device(s) 340 or other similar content sources. A navigation controller 350 comprising one or more navigation features may be used to interact with, for example, platform 302 and/or display 320. Each of these components is described in more detail below.

In embodiments, platform 302 may comprise any combination of a chipset 305, processor 310, memory 312, storage 314, graphics subsystem 315, applications 316, network component 317, and/or radio 318. Chipset 305 may provide intercommunication among processor 310, memory 312, storage 314, graphics subsystem 315, applications 316 and/or radio 318. For example, chipset 305 may include a storage adapter (not depicted) capable of providing intercommunication with storage 314.

Processor 310 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 310 may comprise single-core or multi-core processor(s), single-core or multi-core mobile processor(s), and so forth.

Memory 312 may be implemented as a volatile memory device such as, but not limited to, a Random Access Memory (RAM), Dynamic Random Access Memory (DRAM), or Static RAM (SRAM).). In some embodiments, memory 312 may be implemented as a non-volatile memory such as a flash memory device.

Storage 314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 314 may comprise technology to increase the storage performance enhanced protection for valuable digital media when multiple hard drives are included, for example.

Graphics subsystem 315 may perform processing of images such as still images or video for display. Graphics subsystem 315 may be a graphics processing unit (GPU) or a visual processing unit (VPU), for example. An analog or digital interface may be used to communicatively couple graphics subsystem 315 and display 320. For example, the interface may be any of a High-Definition Multimedia Interface, DisplayPort, wireless HDMI, and/or wireless HD compliant techniques. In embodiments, graphics subsystem 315 could be integrated into processor 310 or chipset 305. In embodiments, graphics subsystem 315 could be a stand-alone card communicatively coupled to chipset 305.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 318 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 318 may operate in accordance with one or more applicable standards in any version.

The network component 317 may include one or more network components capable of transmitting and receiving signals using various suitable wired and/or wireless communications techniques. Such techniques may involve communications across one or more wired and/or wireless networks. In communicating across such networks, network component 517 may operate in accordance with one or more applicable standards in any version.

In embodiments, display 320 may comprise any television type monitor or display. Display 320 may comprise, for example, a computer display screen, touch screen display, video monitor, television-like device, and/or a television. Display 320 may be digital and/or analog. In embodiments, display 320 may be a holographic display. Also, display 320 may be a transparent surface that may receive a visual projection. Such projections may convey various forms of information, images, and/or objects. For example, such projections may be a visual overlay for a mobile augmented reality (MAR) application. Under the control of one or more software applications 316, platform 302 may display user interface 322 on display 320.

In embodiments, content services device(s) 330 may be hosted by any national, international and/or independent service and thus accessible to platform 302 via the Internet, for example. Content services device(s) 330 may be coupled to platform 302 and/or to display 320. Platform 302 and/or content services device(s) 330 may be coupled to a network 360 to communicate (e.g., send and/or receive) media information to and from network 360. Content delivery device(s) 340 also may be coupled to platform 302 and/or to display 320.

In embodiments, content services device(s) 330 may comprise a cable television box, personal computer, network, telephone, camera, Internet enabled devices or appliance capable of delivering digital information and/or content, and any other similar device capable of unidirectionally or bidirectionally communicating content between content providers and platform 302 and/or display 320 directly or via network 360. It will be appreciated that the content may be communicated unidirectionally and/or bidirectionally to and from any one of the components in system 300 and a content provider via network 360. Examples of content may include any media information including, for example, video, music, medical and gaming information, and so forth.

Content services device(s) 330 receives content such as cable television programming including media information, digital information, and/or other content. Examples of content providers may include any cable or satellite television or radio or Internet content providers. The provided examples are not meant to limit embodiments of the invention.

In embodiments, platform 302 may receive control signals from navigation controller 350 having one or more navigation features. The navigation features of controller 350 may be used to interact with user interface 322, for example. In embodiments, navigation controller 350 may be a pointing device, a control pad, a keyboard, or a touch screen device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 350 may be echoed on a display (e.g., display 320) by movements of a pointer, cursor, focus ring, or other visual indicators displayed on the display. For example, under the control of software applications 316, the navigation features located on navigation controller 350 may be mapped to virtual navigation features displayed on user interface 322, for example. In embodiments, controller 350 may not be a separate component but integrated into platform 302 and/or display 320. Embodiments, however, are not limited to the elements or in the context shown or described herein.

In embodiments, drivers (not shown) may comprise technology to enable users to instantly turn on and off platform 302 like a television with the touch of a button after initial boot-up, when enabled, for example. Program logic may allow platform 302 to stream content to media adaptors or other content services device(s) 330 or content delivery device(s) 340 when the platform is turned "off" In addition, chip set 305 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 300 may be integrated. For example, platform 302 and content services device(s) 330 may be integrated, or platform 302 and content delivery device(s) 340 may be integrated, or platform 302, content services device(s) 330, and content delivery device(s) 340 may be integrated, for example. In various embodiments, platform 302 and display 320 may be an integrated unit. Display 320 and content service device(s) 330 may be integrated, or display 320 and content delivery device(s) 340 may be integrated, for example. These examples are not meant to limit the invention.

In various embodiments, system 300 may be implemented as a wireless system, a wired system, or a combination of both. When implemented as a wireless system, system 300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 300 may include components and interfaces suitable for communicating over wired communications media, such as input/output (I/O) adapters, physical connectors to connect the I/O adapter with a corresponding wired communications medium, a network interface card (NIC), network controller (e.g. an Ethernet controller and ports (integrated or external), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 3.

Figure 4:
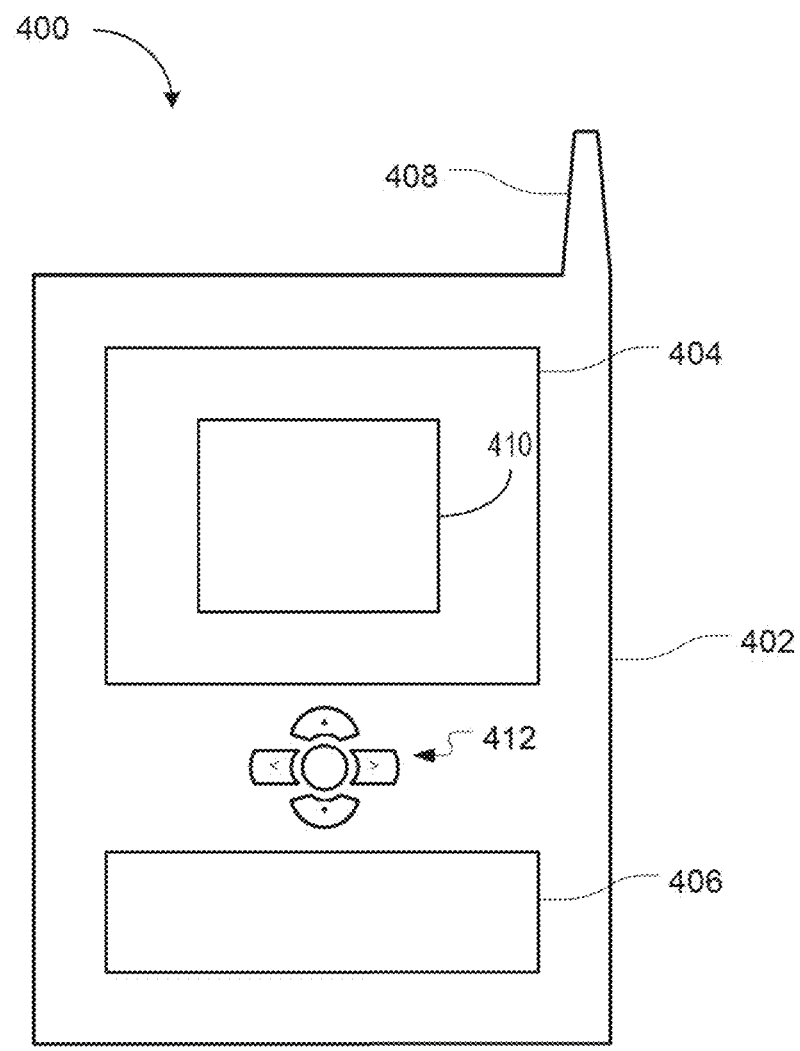
FIG. 4 is a block diagram illustrating an example small form factor device in which components of the system of FIG. 3 may be embodied.

As described above, system 300 may be embodied in varying physical styles or form factors. FIG. 4 illustrates embodiments of a small form factor device 400 in which components of system 300 may be embodied. In embodiments, for example, device 400 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 4, device 400 may comprise a housing 402, a display 404, an input/output (I/O) device 406, and an antenna 408. Device 400 also may comprise navigation features 412. Display 404 may comprise any suitable display unit such as a user interface 410 for displaying information appropriate for a mobile computing device. I/O device 406 may comprise any suitable I/O device for entering information into a mobile computing device. Examples for I/O device 406 may include an alphanumeric keyboard, a numeric keypad, a touch pad, input keys, buttons, switches, rocker switches, microphones, speakers, voice recognition device and software, and so forth. Information also may be entered into device 400 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, drivers, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments may therefore include a method including allocating a first buffer to store source data to be processed by a first thread, allocating one or more duplicate buffers to store the source data to be stored in the first buffer to be processed by one or more other processing threads, respectively, receiving an instruction to write data to the first buffer, and upon receiving the instruction to write data to the first buffer, writing the source data to the first buffer and the one or more duplicate buffers.

Embodiments also may include a system including a data source to provide source data, a first buffer to store the source data to be processed by a first processing thread, one or more duplicate buffers to store the source data to be processed by one or more other processing threads, respectively, a controller to store the source data in the first buffer and the one or more duplicate buffers if the controller receives a command to write the source data to the first buffer, and a processor to process the source data stored in the first buffer and the one or more duplicate buffers.

Embodiments also may include a computer readable medium comprising a set of instructions which, if executed by a processor, cause a computer to allocate a first buffer to store source data to be processed by a first thread, allocate one or more duplicate buffers to store the source data to be stored in the first buffer to be processed by one or more other processing threads, respectively, send the addresses of the first buffer and the one or more duplicate buffers to a memory controller to enable storing the source data written to the first buffer in the one or more duplicate buffers by the memory controller based the addresses, and process the source data stored in the first buffer and the one or more duplicate buffers upon receiver of a buffer-ready signal from the memory controller.

Embodiments also may include a system including a controller to store source data in a first buffer and one or more duplicate buffers when the controller receives a command to write the source data to the first buffer, and storage to store one or more addresses of the first buffer and the one or more duplicate buffers.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. A non-transitory computer readable medium comprising a set of instructions which, if executed by a processor, cause a computer to:
   allocate a first buffer to store source data comprising frame data to be processed by a first thread;
   allocate one or more duplicate buffers to store one or more duplicates of the source data to be stored in the first buffer to be processed in parallel by one or more other processing threads, respectively;
   send addresses of the first buffer and the one or more duplicate buffers to a memory controller;
   set a flag for each of the one or more duplicate buffers to control whether the source data is written to the one or more duplicate buffers;
   store the source data written to the first buffer in the one or more duplicate buffers by the memory controller based on the addresses and the one or more flags; and process the source data stored in the first buffer and the one or more duplicate buffers upon receipt of a buffer-ready signal from the memory controller.

2. The non-transitory computer readable medium of claim 1, wherein the source data is frame data.

3. The non-transitory computer readable medium of claim 1, wherein the source data is image data.

4. The non-transitory computer readable medium of claim 1, wherein the first buffer and the one or more duplicate buffers are frame buffers.

5. The non-transitory computer readable medium of claim 1, wherein the first buffer and the one or more duplicate buffers are image buffers.

6. A method comprising:
   allocating a first buffer to store source data comprising frame data to be processed by a first thread;
   allocating one or more duplicate buffers to store one or more duplicates of the source data to be stored in the first buffer to be processed in parallel by one or more other processing threads, respectively;
   sending addresses of the first buffer and the one or more duplicate buffers to a memory controller;
   setting a flag for each of the one or more duplicate buffers to control whether the source data is written to the one or more duplicate buffers;
   storing the source data written to the first buffer in the one or more duplicate buffers by the memory controller based on the addresses and the one or more flags; and
   processing the source data stored in the first buffer and the one or more duplicate buffers upon receipt of a buffer-ready signal from the memory controller.

7. The method of claim 6, wherein the source data is frame data.

8. The method of claim 6, wherein the source data is image data.

9. The method of claim 6, wherein the first buffer and the one or more duplicate buffers are frame buffers.

10. The method of claim 6, wherein the first buffer and the one or more duplicate buffers are image buffers.

11. A system comprising:
   a memory controller to store source data written to a first buffer in one or more duplicate buffers based on addresses of the first buffer and the one or more duplicate buffers, and one or more flags; and
   a processor to:
   allocate the first buffer to store the source data comprising frame data to be processed by a first thread;
   allocate the one or more duplicate buffers to store one or more duplicates of the source data to be stored in the first buffer to be processed in parallel by one or more other processing threads, respectively;
   send the addresses of the first buffer and the one or more duplicate buffers to the memory controller;
   set a flag for each of the one or more duplicate buffers to control whether the source data is written to the one or more duplicate buffers; and
   process the source data stored in the first buffer and the one or more duplicate buffers upon receipt of a buffer-ready signal from the memory controller.

12. The system of claim 11, wherein the source data is frame data.

13. The system of claim 11, wherein the source data is image data.

14. The system of claim 11, wherein the first buffer and the one or more duplicate buffers are frame buffers.

15. The system of claim 11, wherein the first buffer and the one or more duplicate buffers are image buffers.

* * * * *